United States Patent
Melnyk et al.

(10) Patent No.: US 9,602,718 B2
(45) Date of Patent: Mar. 21, 2017

(54) SYSTEM AND METHOD FOR PROVIDING ORIENTATION OF A CAMERA

(75) Inventors: Pavlo Melnyk, Waterloo (CA); Rouzbeh Noori, Waterloo (CA); Robert Joseph Lessard, Cambridge (CA); James C. Walkoski, Waterloo (CA); Cory Kyle Hatto Metcalfe, Headingley (CA)

(73) Assignee: BlackBerry Limited, Waterloo, Ontario (CA)

( * ) Notice: Subject to any disclaimer, the term of this patent is extended or adjusted under 35 U.S.C. 154(b) by 266 days.

(21) Appl. No.: 14/370,767

(22) PCT Filed: Jan. 6, 2012
(Under 37 CFR 1.47)

(86) PCT No.: PCT/CA2012/000011
§ 371 (c)(1),
(2), (4) Date: Dec. 10, 2014

(87) PCT Pub. No.: WO2013/102251
PCT Pub. Date: Jul. 11, 2013

(65) Prior Publication Data
US 2016/0269622 A1    Sep. 15, 2016

(51) Int. Cl.
*H04N 5/235* (2006.01)
*H04N 5/232* (2006.01)
(Continued)

(52) U.S. Cl.
CPC ......... *H04N 5/23222* (2013.01); *G03B 17/18* (2013.01); *G06T 7/004* (2013.01);
(Continued)

(58) Field of Classification Search
CPC .................................................. H04N 5/23222
See application file for complete search history.

(56) References Cited

U.S. PATENT DOCUMENTS 7,720,436 B2    5/2010    Hamynen et al.
7,725,258 B2 *  5/2010    Smitherman .......... G01C 11/02
                                                348/144
(Continued)

FOREIGN PATENT DOCUMENTS

DE    102005061952 A1    6/2007
EP         1710750 A2    10/2006
(Continued)

OTHER PUBLICATIONS

MARA/Nokia Research Centre; Overview; http://research.nokia.com/page/219; printed from the Internet on Sep. 30, 2011.
(Continued)

*Primary Examiner* — Gary C Vieaux
(74) *Attorney, Agent, or Firm* — Thomas Grzesik; Fleit Gibbons Gutman; Bongini & Bianco, P.L.

(57) ABSTRACT

A system and a method provide an orientation of a camera on a mobile device. This information can be used in an augmented reality application. The method comprises obtaining an orientation measurement from a sensor relative to the orientation of the sensor. The sensor may have different orientation compared to the camera and, thus, the orientation measurement needs to be adjusted. An appropriate transformation matrix is obtained, which maps the orientation measurement to the camera's perspective. A processor of the mobile device computes the orientation of the camera using the orientation measurement and the transformation matrix.

19 Claims, 10 Drawing Sheets

(51) Int. Cl.
  *G03B 17/18*    (2006.01)
  *H04N 5/222*    (2006.01)
  *H04N 21/422*   (2011.01)
  *H04N 21/4223*  (2011.01)
  *G06T 7/00*     (2006.01)

(52) U.S. Cl.
  CPC .......... *H04N 5/2224* (2013.01); *H04N 5/232* (2013.01); *H04N 5/23258* (2013.01); *H04N 21/4223* (2013.01); *H04N 21/42201* (2013.01); *G06T 2207/10004* (2013.01); *G06T 2207/20048* (2013.01); *G06T 2207/30244* (2013.01)

(56) References Cited

U.S. PATENT DOCUMENTS

| | | | |
|---|---|---|---|
| 8,730,332 B2 * | 5/2014 | Paoletti | A61B 5/4561 348/207.1 |
| 8,749,583 B2 | 6/2014 | Suzuki et al. | |
| 2002/0161280 A1 * | 10/2002 | Chatenever | A61B 1/042 600/112 |
| 2002/0169553 A1 * | 11/2002 | Perlmutter | G01C 21/165 701/472 |
| 2006/0050087 A1 | 3/2006 | Tanimura et al. | |
| 2008/0108869 A1 * | 5/2008 | Sanders | A61B 1/00105 600/109 |
| 2010/0208057 A1 | 8/2010 | Meier et al. | |
| 2011/0159921 A1 | 6/2011 | Davis et al. | |
| 2011/0161076 A1 | 6/2011 | Davis et al. | |
| 2011/0169861 A1 | 7/2011 | Suzuki et al. | |
| 2011/0178707 A1 | 7/2011 | Sachs et al. | |

FOREIGN PATENT DOCUMENTS

| | | |
|---|---|---|
| EP | 1980820 A3 | 4/2014 |
| WO | 2008020339 | 2/2008 |
| WO | 2011091522 A1 | 8/2011 |

OTHER PUBLICATIONS

Fournier, Bruce; Memorandum—RIM Augmented Reality Development; dated Oct. 7, 2011.

Abou-Antoun, Patrick; International Search Report from corresponding PCT Application No. PCT/CA2012/000011; search completed Sep. 11, 2012.

* cited by examiner ial may be repeated among the example figures to indicate
SYSTEM AND METHOD FOR PROVIDING ORIENTATION OF A CAMERA

TECHNICAL FIELD

The following relates generally to providing orientation information of a camera.

DESCRIPTION OF THE RELATED ART

In some augmented reality applications on mobile devices, a camera is used to capture an image of a scene and information is provided about the scene. For example, an augmented reality application may show the direction a camera is facing. The facing direction of the camera can be obtained from sensors on the mobile device, such as a magnetometer, accelerometer, or gyroscope.

BRIEF DESCRIPTION OF THE DRAWINGS

Example embodiments will now be described by way of example only with reference to the appended drawings wherein.

DETAILED DESCRIPTION

Figure 1:
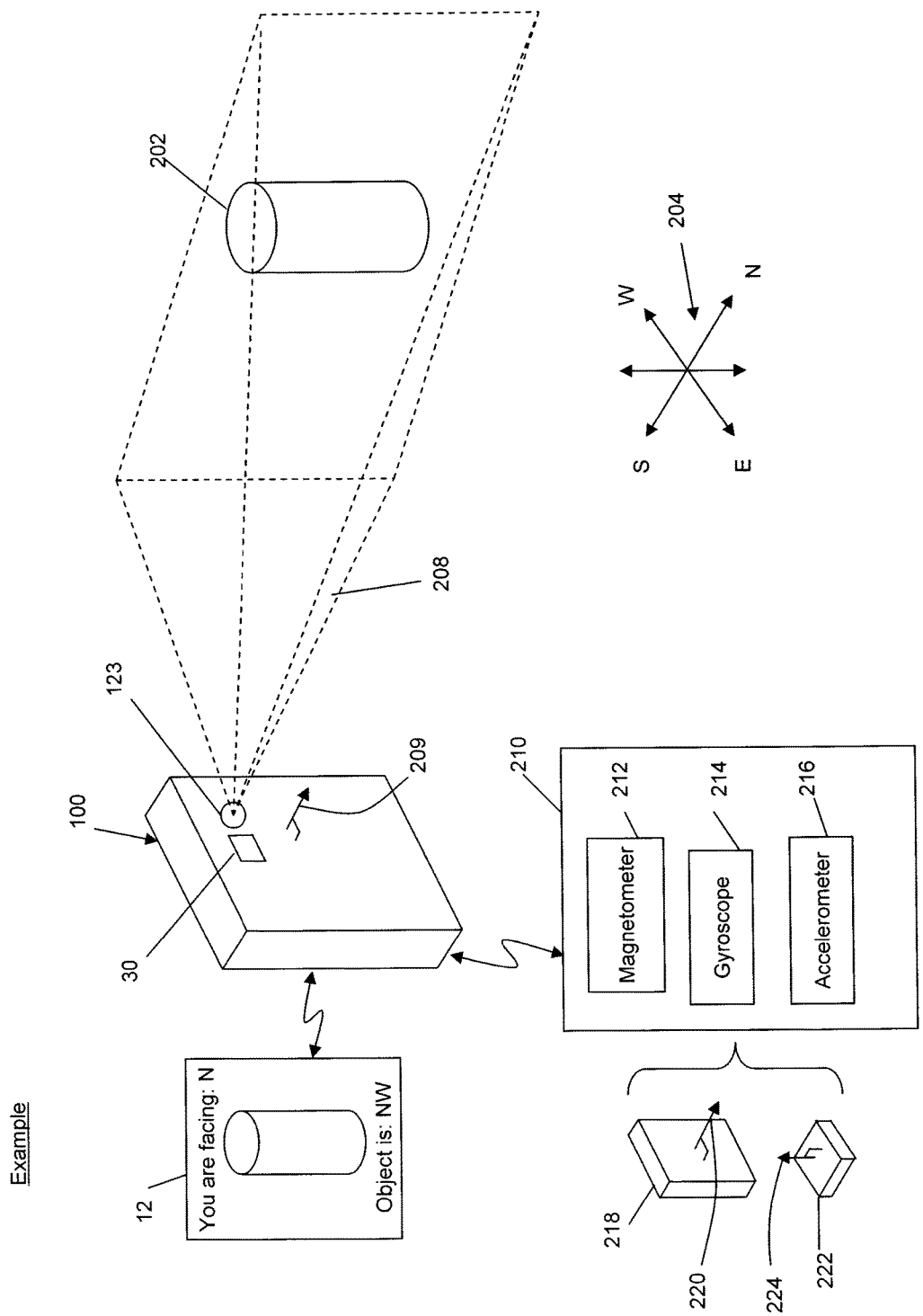
FIG. 1 is a schematic diagram of a mobile device and an object, according to an example embodiment.

It will be appreciated that for simplicity and clarity of illustration, where considered appropriate, reference numerals may be repeated among the example figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

A mobile device can include a camera for taking video or capturing still images. A mobile device may also include sensors, such as a magnetometer, a gyroscope, an accelerometer, etc. for determining orientation and direction. Some applications, such as augmented reality applications, combine the functions of the sensors and the camera to provide information about what the camera "sees". For example, an application on the mobile device may display a picture taken by the camera and show that, from the camera's perspective, the camera is facing a certain direction. Such an example is shown in FIG. 1.

Turning to FIG. 1, a mobile device 100 having a camera 123 and a light or flash device 30 is shown. The camera 123 is capturing an image of an object 202, which is in its field of view, as represented by the dotted lines 208. A frame of reference 204 shows the directions North, South, East and West. The mobile device 100 also includes sensors 210 (e.g. magnetometer 212, gyroscope 214, accelerometer 216, etc.). An augmented reality application shows on the display screen 12 of the mobile device 100, an image of the object 202 as well as direction information. For example, the display 12 shows that the device 100, from the camera's perspective, is facing North and the object 202 is located North-West compared to the facing direction of the camera.

It is recognized that the measurements from the sensors 210 are relative to each of the sensors 210. The camera's sensor, the charge-coupled device (CCD), for example, may have a different orientation (as it is positioned within or on the mobile device 100) from the orientation of the sensor (as it is positioned within or on the mobile device 100). In other words, the measurement taken from a sensor is relative to the orientation of the sensor, and the measurement may not take into consideration the orientation of the camera's facing direction. An application on the mobile device may be specific to that particular mobile device and the application may compute the relative direction and orientation of a camera based on the measurement by the sensor 210 (from where the sensor is positioned within or on the mobile device 100).

However, different mobile devices have different configurations (e.g. different positions of sensors 210 and camera 123 within or on the mobile devices) and, therefore, the relative orientation and configuration between the sensors 210 and the camera 123 may be different across different mobile devices 100.

An application that is specific to the mobile device 100 will take into account the relative positioning and orientation between the sensor 210 and the camera 123, and using a transformation, use the measurements from the sensor 210 to compute the direction and orientation of the camera 123. If an application is specific to a mobile device 100, then different variants of the application are used to accommodate the different configurations of different mobile devices. For example, one mobile device 100 may have use one variation of an augmented reality application, while another mobile device 100 may use another variation of the same augmented reality application. This can become more complicated for developers or programmers who create augmented reality applications because there are numerous configurations between cameras and sensors on mobile devices. Keeping track of all the different configurations can be difficult, and making different variations of an application for the different configurations can be time consuming.

For example, continuing with FIG. 1, a magnetometer 218 having a normal vector 220 is shown. In this example, the normal vector 220 is parallel to the normal vector 209 of the camera sensor of camera 123. The orientation of the magnetometer 218 may therefore be already physically aligned with the camera sensor of camera 123. Therefore, when the magnetometer 218 measures that its normal vector 220 is pointing North, the camera sensor of camera 123 is also pointing North.

In another example, in FIG. 1, the magnetometer 222 may be in a different configuration and its normal vector 224 may be pointing up. In other words, the normal 224 of the magnetometer 222 does not align with the normal vector 209 of the camera 123. In such an example, a measurement from the magnetometer 222 indicating that it is pointing North, does not mean that the camera sensor of camera 123 is pointing North. A computation is required to translate or map the measurement from the magnetometer 222 to the orientation of the camera 123. It can be appreciated that there are various other example configurations between other sensors (e.g. gyroscope, accelerometer, etc.) and other cameras. For example, there can be a forward facing camera and a backward facing camera. It can be appreciated that the mappings can be different between different sensors and cameras.

It can be appreciated that the orientation and position of a sensor 210 can affect the meaning or interpretation of the measurement data output by the sensor 210.

The proposed systems and methods described herein take into account the various configurations and provide a database of transformation matrices used to map measurements from a sensor to a camera. Methods are also provided for determining which transformation matrix is to be used, and if it is to be modified.

Figure 2:
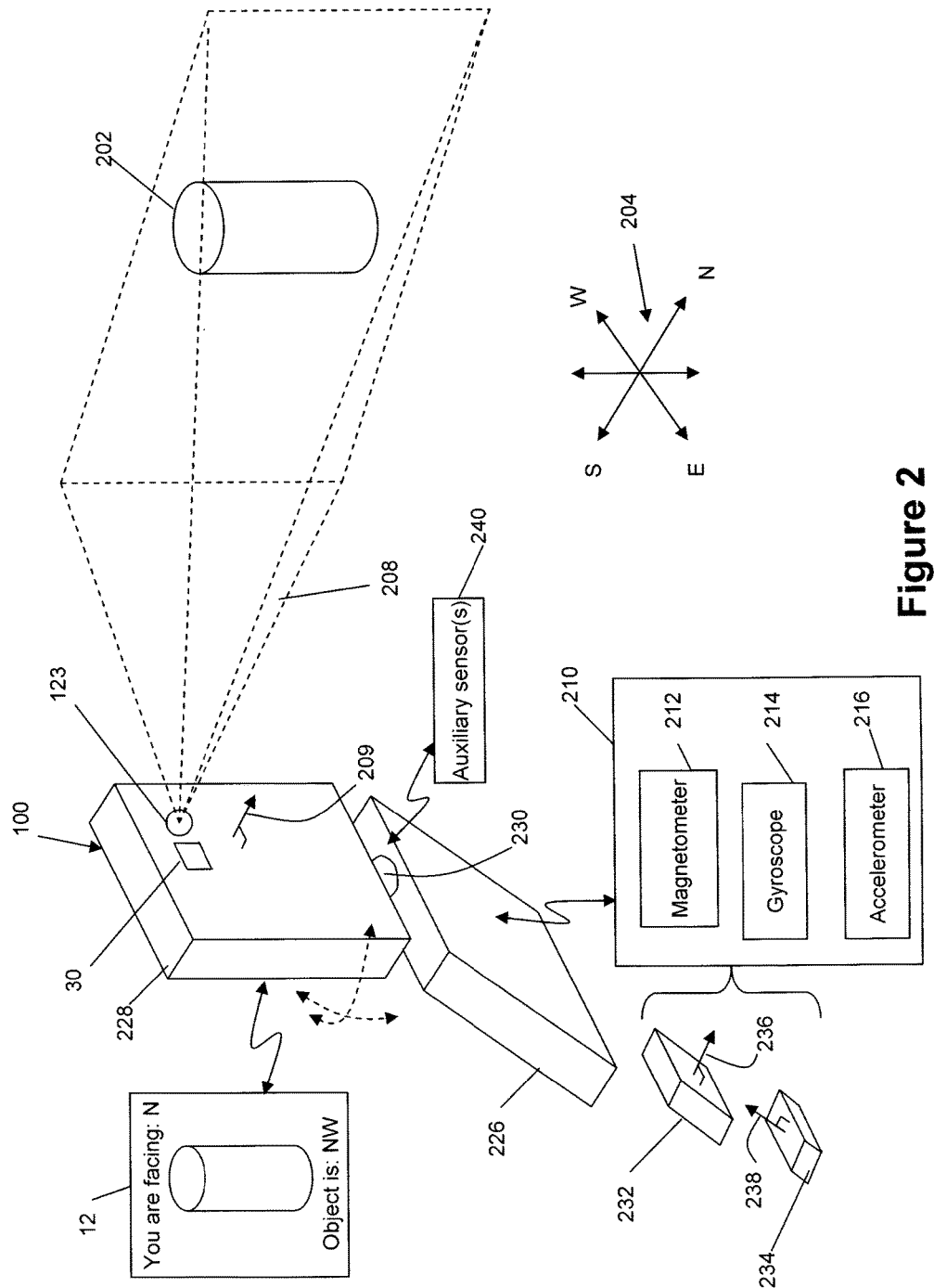
FIG. 2 is a schematic diagram of a mobile device with rotatable parts and an object, according to an example embodiment.

Turning to FIG. 2, another example configuration of a mobile device 100 is shown. The mobile device 100 is considered a flip phone which has a first part 228 and a second part 226 that are able to move relative to each other. For example, they can rotate up and down relative to each other. In another example embodiment, the first part 228 and the second part 226 can swivel or rotate in various different axes. For example, there may be a multi-axis joint 230 connecting the first part 228 and the second part 226. The joint 230 may, for example, be a ball joint.

The mobile device 100 may also include one or more auxiliary sensors 240 to measure the relative positioning of the first part 228 and the second part 226. For example, the auxiliary sensor 240 is able to determine whether the mobile device 100 is flipped open, closed, in an intermediate opened position, in a swivelled position, the angle of rotation along various axes, etc. Non-limiting examples of the auxiliary sensor or sensors 240 include a transducer, a photo resistor, a switch, an optical switch, a proximity sensor, a magnetic sensor, and combinations thereof. The relative positioning of the parts 228, 226 can also be measured or computed by taking the measurements from the gyroscope 214 or accelerometer 216, or both. It can be appreciated that other sensors suitable for measuring the relative positioning and orientation of the various parts of the mobile device 100 can also be used.

The camera 123 may be mounted or positioned within the first part 228 of the mobile device 100, while the sensor or sensors 210 may be positioned in the second part 226. As the parts 228, 226 move relative to each other, the sensor or sensors 210 also move relative to the camera 123. In one example embodiment, if a sensor 232 (e.g. magnetometer, gyroscope, accelerometer, etc.) is positioned in the second part 226, which is at an angle to the first part 228, the sensor's 232 normal vector 236 is pointed at a downward angle relative to the camera's normal vector 209.

In another example embodiment in FIG. 2, the sensor 234 is located in the second part 226, and its normal vector 238 is pointed at an upward angle relative to the normal vector 209 of the camera 123.

The mapping of the direction or orientation measurements from the sensors can, therefore, change relative the camera 123. The mapping or transformation of the data from the sensors 232, 234, 210 (e.g. magnetometers, accelerometers, gyroscopes, etc.) to the camera 123 depends on their relative positioning and orientation, which can change in the flip phone, as shown, for example, in FIG. 2. The mapping function or transformation process (e.g. the transformation matrix) may take into account the measurement data from the auxiliary sensor or sensors 240 to map or transform the direction or orientation measurements outputted from the sensor or sensors 210 to the direction or orientation of the camera 123. The transformation process or transformation matrix can be considered dynamic and may depend on the data provided by the auxiliary sensor or sensors 240. The parameters used in the transformation process may be represented as a transformation matrix.

In an example embodiment, a transformation matrix contains values that can be used to transform the measurement data of a sensor, which is from the perspective of the sensor package, to measurement data that is from the perspective of a camera. For example, the values in the transformation matrix can include rotation angles to adjust one or more axes, and translations of distance to adjust for the different positioning between a sensor and a camera.

The example embodiments described herein also apply to other mobile devices having parts that move relative to one another. Non-limiting examples include mobile devices that have one part slide relative to another part, and laptops or other mobile devices that have a display portion able to flip up and down as well as swivel around relative to a base portion.

Figure 3:
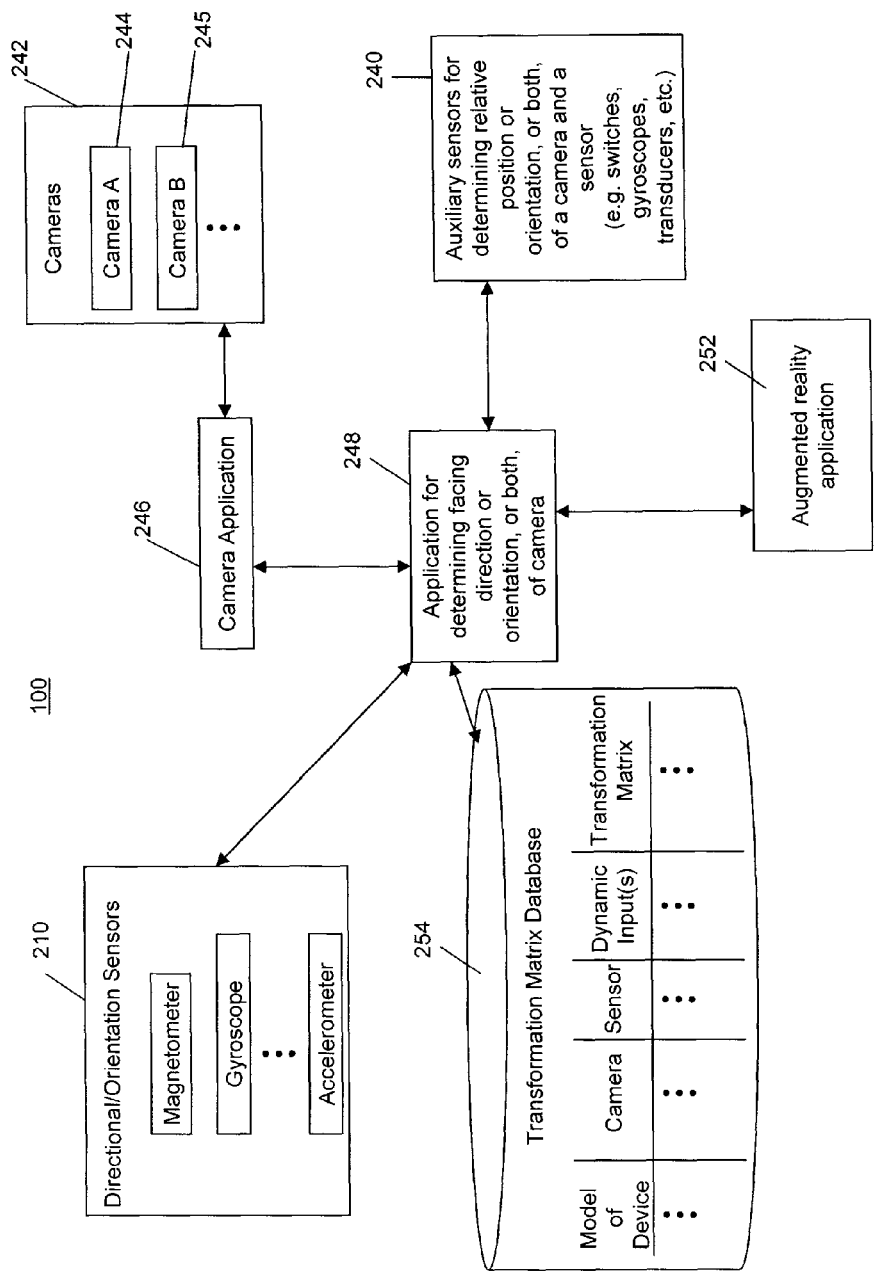
FIG. 3 is a block diagram of example embodiment components of a mobile device configured to determine the facing direction, or orientation, or both, of a camera.

Turning to FIG. 3, an example configuration of a mobile device 100 is shown. The mobile device 100 may include one or more cameras 244, 245. For example, a camera may have one camera, two cameras, or any other number of cameras. The cameras can be controlled and monitored by a camera application 246. The camera application 246 can determine which camera or cameras are being activated. The camera application 246 is in communication with an application 248 for determining the facing direction or orientation, or both, of a given camera on the mobile device 100.

The mobile device 100 also includes one or more direction or orientation sensors 210, or both (e.g. magnetometer, gyroscope, accelerometer, etc.). Such a sensor or sensors are in communication with the application 248 for determining the facing direction or orientation, or both, of a given camera on the mobile device 100. Similarly, the auxiliary sensor or sensors 240 for determining the relative position or orientation, or both, of a camera and a sensor are also in communication with the application 240.

Continuing with FIG. 3, the mobile device 100 includes a transformation matrix database 254 which stores one or more transformation matrices. Each transformation matrix can be applied to the data output of a given sensor 210 to compute the direction or orientation of a given camera 242. Data is associated with each transformation matrix to help determine and select which transformation matrix is most appropriate for a given situation.

For example, the data associated with each transformation matrix in the database 254 may include a model of the mobile device, a camera identity, a sensor identity and a dynamic input (e.g. from one or more auxiliary sensors 240). It can be appreciated that other data may be associated with a transformation matrix.

It can also be appreciated that the model of the mobile device is a way to identify the configuration of a mobile device 100. Different models of mobile devices may have different camera and sensor configurations, and thus, a particular model of a mobile device is associated with a particular transformation matrix.

The model of the mobile device, the camera identity, and the sensor identity can be, for example, represented with numbers, letters, or combinations thereof.

The application 248 for determining the facing direction or orientation, or both, of a camera is in communication with the database 248.

In an example embodiment, the application 248 obtains the camera identity of which camera is being activated, for example, from the camera application 246. The application 248 also obtains the measurement data from a sensor 210, as well as the identity of the sensor providing the measurement data. Depending on the type or model of the mobile device, may also obtain dynamic inputs from one or more auxiliary sensors 240. The application 248 also obtains the model of the mobile device. For example, the application 248 may obtain the model from the mobile device's system parameters. The application 248 may use the model of the mobile device to select an appropriate transformation matrix from the database 254.

In models of mobile devices that have multiple orientation or direction sensors 210, or both, the application 248 may also use the sensor identity to search the database 254 for an appropriate transformation matrix. Similarly, if the given model of a mobile device has multiple cameras, the application 248 may use the camera identity to search the database 254 for an appropriate transformation matrix. In other words, the application 248 can use different types of information (e.g. model of the device, camera identity, sensor identity, or combinations thereof) to search for the appropriate transformation matrix. After determining the appropriate transformation matrix, it may modify the transformation matrix according to the dynamic inputs, for example, as provided by the auxiliary sensor or sensors 240.

The application 248 may then use the obtained transformation matrix and the measurement data of the orientation or direction sensor 210 to compute the orientation or direction of the camera 242. This orientation or direction of the camera may be provided to an augmented reality application 252.

It can be appreciated that various mobile devices can be used with the example embodiments described herein. Examples of applicable electronic devices include pagers, tablets, cellular phones, cellular smart-phones, wireless organizers, personal digital assistants, computers, laptops, handheld wireless communication devices, wirelessly enabled notebook computers, camera devices and the like. Such devices will hereinafter be commonly referred to as "mobile devices" for the sake of clarity. It will however be appreciated that the example embodiments described herein are also suitable for other devices, e.g. "non-mobile" devices.

In an example embodiment, the mobile device is a two-way communication device with advanced data communication capabilities including the capability to communicate with other mobile devices or computer systems through a network of transceiver stations. The mobile device may also have the capability to allow voice communication. Depending on the functionality provided by the mobile device, it may be referred to as a data messaging device, a two-way pager, a cellular telephone with data messaging capabilities, a wireless Internet appliance, or a data communication device (with or without telephony capabilities).

Figure 5:
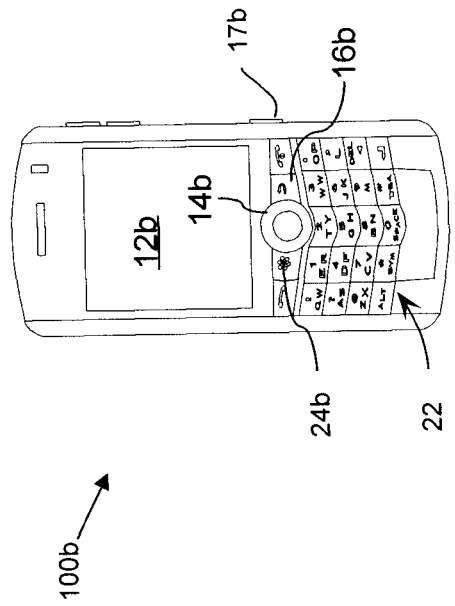
FIG. 5 is a plan view of another example embodiment mobile device.
Figure 4:
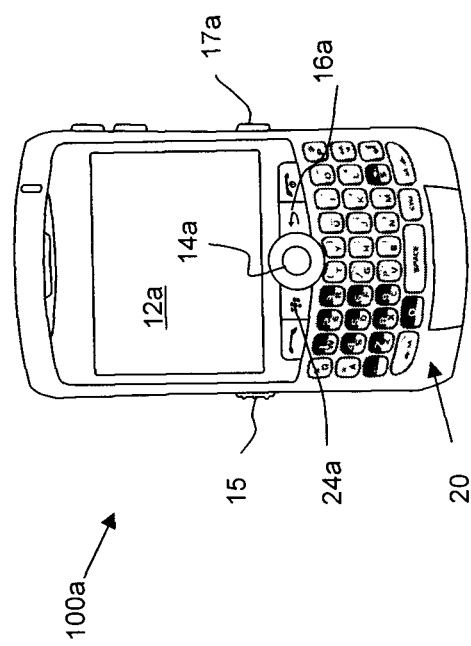
FIG. 4 is a plan view of an example embodiment mobile device.

Referring to FIGS. 4 and 5, an example embodiment of a mobile device 100a is shown in FIG. 4, and another example embodiment of a mobile device 100b is shown in FIG. 5. It will be appreciated that the numeral "100" will hereinafter refer to any mobile device 100, including the example embodiments 100a and 100b, those example embodiments enumerated above or otherwise. It will also be appreciated that a similar numbering convention may be used for other general features common between all Figures such as a display 12, a positioning device 14, a cancel or escape button 16, a camera button 17, and a menu or option button 24.

The mobile device 100a shown in FIG. 4 comprises a display 12a and the cursor or view positioning device 14 shown in this example embodiment is a trackball 14a. Positioning device 14 may serve as another input member and is both rotational to provide selection inputs to the main processor 102 (see FIG. 5) and can also be pressed in a direction generally toward housing to provide another selection input to the processor 102. Trackball 14a permits multi-directional positioning of the selection cursor 18 (see FIG. 7) such that the selection cursor 18 can be moved in an upward direction, in a downward direction and, if desired and/or permitted, in any diagonal direction. The trackball 14a is in this example situated on the front face of a housing for mobile device 100a as shown in FIG. 4 to enable a user to manoeuvre the trackball 14a while holding the mobile device 100a in one hand. The trackball 14a may serve as another input member (in addition to a directional or positioning member) to provide selection inputs to the processor 102 and can preferably be pressed in a direction towards the housing of the mobile device 100b to provide such a selection input.

The display 12 may include a selection cursor 18 that depicts generally where the next input or selection will be received. The selection cursor 18 may comprise a box, alteration of an icon or any combination of features that enable the user to identify the currently chosen icon or item. The mobile device 100a in FIG. 4 also comprises a programmable convenience button 15 to activate a selected application such as, for example, a calendar or calculator. Further, mobile device 100a includes an escape or cancel button 16a, a camera button 17a, a menu or option button 24a and a keyboard 20. The camera button 17 is able to activate photo-capturing functions when pressed preferably in the direction towards the housing. The menu or option button 24 loads a menu or list of options on display 12a when pressed. In this example, the escape or cancel button 16a, the menu option button 24a, and keyboard 20 are disposed on the front face of the mobile device housing, while the convenience button 15 and camera button 17a are disposed at the side of the housing. This button placement enables a user to operate these buttons while holding the mobile device 100 in one hand. The keyboard 20 is, in this example embodiment, a standard QWERTY keyboard.

The mobile device 100*b* shown in FIG. 5 comprises a display 12*b* and the positioning device 14 in this example embodiment is a trackball 14*b*. The mobile device 100*b* also comprises a menu or option button 24*b*, a cancel or escape button 16*b*, and a camera button 17*b*. The mobile device 100*b* as illustrated in FIG. 5, comprises a reduced QWERTY keyboard 22. In this example embodiment, the keyboard 22, positioning device 14*b*, escape button 16*b* and menu button 24*b* are disposed on a front face of a mobile device housing. The reduced QWERTY keyboard 22 comprises a plurality of multi-functional keys and corresponding indicia including keys associated with alphabetic characters corresponding to a QWERTY array of letters A to Z and an overlaid numeric phone key arrangement.

It will be appreciated that for the mobile device 100, a wide range of one or more positioning or cursor/view positioning mechanisms such as a touch pad, a positioning wheel, a joystick button, a mouse, a touchscreen, a set of arrow keys, a tablet, an accelerometer (for sensing orientation and/or movements of the mobile device 100 etc.), or other whether presently known or unknown may be employed. Similarly, any variation of keyboard 20, 22 may be used. It will also be appreciated that the mobile devices 100 shown in FIGS. 4 and 5 are for illustrative purposes only and various other mobile devices 100 are equally applicable to the following examples. For example, other mobile devices 100 may include the trackball 14*b*, escape button 16*b* and menu or option button 24 similar to that shown in FIG. 5 only with a full or standard keyboard of any type. Other buttons may also be disposed on the mobile device housing such as colour coded "Answer" and "Ignore" buttons to be used in telephonic communications. In another example, the display 12 may itself be touch sensitive thus itself providing an input mechanism in addition to display capabilities.

To aid the reader in understanding the structure of the mobile device 100, reference will now be made to FIGS. 6 through 8.

Figure 6:
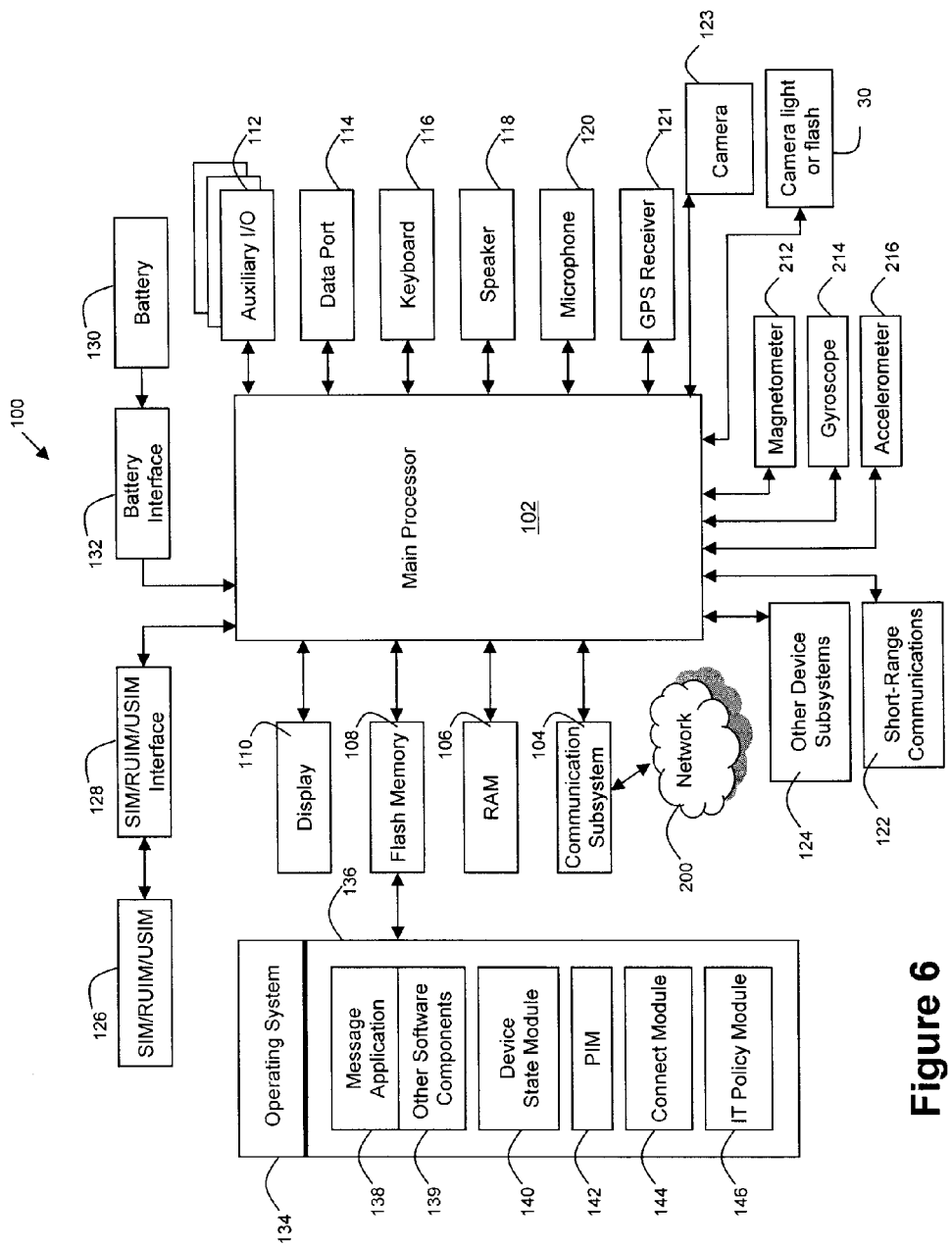
FIG. 6 is a block diagram of an example embodiment of a mobile device.

Referring first to FIG. 6, shown therein is a block diagram of an example embodiment of a mobile device 100. The mobile device 100 comprises a number of components such as a main processor 102 that controls the overall operation of the mobile device 100. Communication functions, including data and voice communications, are performed through a communication subsystem 104. The communication subsystem 104 receives messages from and sends messages to a wireless network 200. In this example embodiment of the mobile device 100, the communication subsystem 104 is configured in accordance with the Global System for Mobile Communication (GSM) and General Packet Radio Services (GPRS) standards, which is used worldwide. Other communication configurations that are equally applicable are the 3G and 4G networks such as EDGE, UMTS and HSDPA, LTE, Wi-Max etc. New standards are still being defined, but it is believed that they will have similarities to the network behaviour described herein, and it will also be understood by persons skilled in the art that the example embodiments described herein are intended to use any other suitable standards that are developed in the future. The wireless link connecting the communication subsystem 104 with the wireless network 200 represents one or more different Radio Frequency (RF) channels, operating according to defined protocols specified for GSM/GPRS communications.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, a GPS receiver 121, short-range communications 122, a camera 123, a camera light or flash 30, and other device subsystems 124.

The main processor 102 may also interact with sensors 210 and auxiliary sensors 240. As shown in FIG. 6, the main processor 102 is interacting with a magnetometer 212, a gyroscope 214, and an accelerometer 216.

Some of the subsystems of the mobile device 100 perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list.

The mobile device 100 can send and receive communication signals over the wireless network 200 after required network registration or activation procedures have been completed. Network access is associated with a subscriber or user of the mobile device 100. To identify a subscriber, the mobile device 100 may use a subscriber module component or "smart card" 126, such as a Subscriber Identity Module (SIM), a Removable User Identity Module (RUIM) and a Universal Subscriber Identity Module (USIM). In the example shown, a SIM/RUIM/USIM 126 is to be inserted into a SIM/RUIM/USIM interface 128 in order to communicate with a network. Without the component 126, the mobile device 100 is not fully operational for communication with the wireless network 200. Once the SIM/RUIM/USIM 126 is inserted into the SIM/RUIM/USIM interface 128, it is coupled to the main processor 102.

The mobile device 100 is a battery-powered device and includes a battery interface 132 for receiving one or more rechargeable batteries 130. In at least some example embodiments, the battery 130 can be a smart battery with an embedded microprocessor. The battery interface 132 is coupled to a regulator (not shown), which assists the battery 130 in providing power V+ to the mobile device 100. Although current technology makes use of a battery, future technologies such as micro fuel cells may provide the power to the mobile device 100.

The mobile device 100 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, may be installed on the mobile device 100 during its manufacture. Software applications may include a message application 138, a device state module 140, a Personal Information Manager (PIM) 142, a connect module 144 and an IT policy module 146. A message application 138 can be any suitable software program that allows a user of the mobile device 100 to send and receive electronic messages, wherein messages are typically stored in the flash memory 108 of the mobile device 100. A device state module 140 provides persistence, i.e. the device state module 140 ensures that important device data is stored in persistent memory, such as the flash memory 108, so that the data is not lost when the mobile device 100 is turned off or loses power. A PIM 142 includes functionality for organizing and managing data items of interest to the user, such as, but not limited to, e-mail, contacts, calendar events, and voice mails, and may interact with the wireless network 200. A connect module 144 implements the communication protocols that are required for the mobile device 100 to communicate with the wireless infrastructure and any host system, such as an enterprise system, that the mobile device 100 is authorized to interface with. An IT policy module 146 receives IT policy data that encodes the IT policy, and may be responsible for organizing and securing rules such as the "Set Maximum Password Attempts" IT policy.

Other types of software applications or components 139 can also be installed on the mobile device 100. These software applications 139 can be pre-installed applications (i.e. other than message application 138) or third party applications, which are added after the manufacture of the mobile device 100. Examples of third party applications include games, calculators, utilities, etc.

The additional applications 139 can be loaded onto the mobile device 100 through at least one of the wireless network 200, the auxiliary I/O subsystem 112, the data port 114, the short-range communications subsystem 122, or any other suitable device subsystem 124.

The data port 114 can be any suitable port that enables data communication between the mobile device 100 and another computing device. The data port 114 can be a serial or a parallel port. In some instances, the data port 114 can be a USB port that includes data lines for data transfer and a supply line that can provide a charging current to charge the battery 130 of the mobile device 100.

For voice communications, received signals are output to the speaker 118, and signals for transmission are generated by the microphone 120. Although voice or audio signal output is accomplished primarily through the speaker 118, the display 110 can also be used to provide additional information such as the identity of a calling party, duration of a voice call, or other voice call related information.

Figure 7:
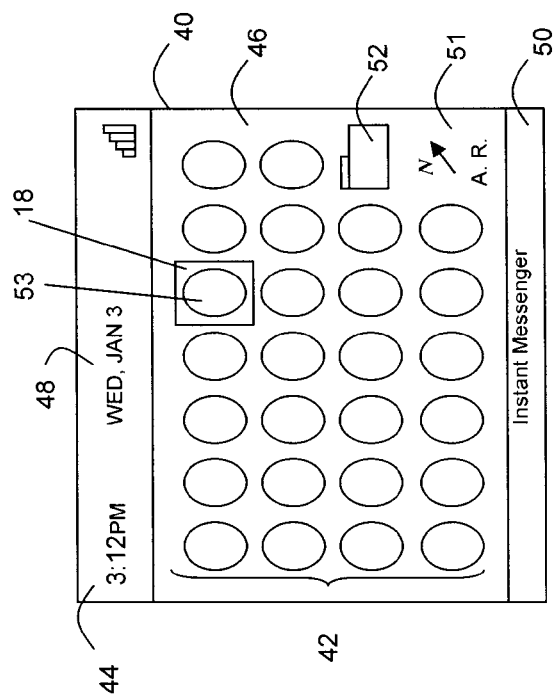
FIG. 7 is a screen shot of a home screen displayed by the mobile device, according to an example embodiment.

Turning now to FIG. 7, the mobile device 100 may display a home screen 40, which can be set as the active screen when the mobile device 100 is powered up and may constitute the main ribbon application. The home screen 40 generally comprises a status region 44 and a theme background 46, which provides a graphical background for the display 12. The theme background 46 displays a series of icons 42 in a predefined arrangement on a graphical background. In some themes, the home screen 40 may limit the number icons 42 shown on the home screen 40 so as to not detract from the theme background 46, particularly where the background 46 is chosen for aesthetic reasons. The theme background 46 shown in FIG. 7 provides a grid of icons. It will be appreciated that preferably several themes are available for the user to select and that any applicable arrangement may be used. An example icon may be an augmented reality icon 51 used to indicate an augmented reality application, for example, for determining direction or orientation. One or more of the series of icons 42 is typically a folder 52 that itself is capable of organizing any number of applications therewithin.

The status region 44 in this example embodiment comprises a date/time display 48. The theme background 46, in addition to a graphical background and the series of icons 42, also comprises a status bar 50. The status bar 50 provides information to the user based on the location of the selection cursor 18, e.g. by displaying a name for the icon 53 that is currently highlighted.

An application, such as message application 138 may be initiated (opened or viewed) from display 12 by highlighting a corresponding icon 53 using the positioning device 14 and providing a suitable user input to the mobile device 100. For example, message application 138 may be initiated by moving the positioning device 14 such that the icon 53 is highlighted by the selection box 18 as shown in FIG. 7, and providing a selection input, e.g. by pressing the trackball 14b.

Figure 8:
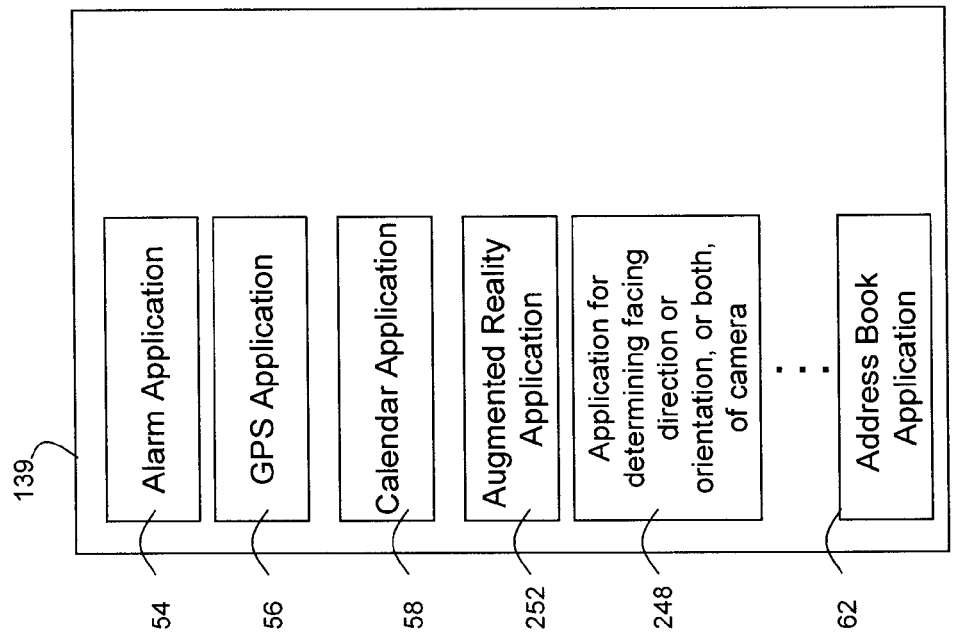
FIG. 8 is a block diagram illustrating example embodiments of the other software applications and components shown in FIG. 6.

FIG. 8 shows an example of the other software applications and components 139 that may be stored and used on the mobile device 100. Only examples are shown in FIG. 8 and such examples are not to be considered exhaustive. In this example, an alarm application 54 may be used to activate an alarm at a time and date determined by the user. A GPS application 56 may be used to determine the location of a mobile device. A calendar application 58 that may be used to organize appointments. Another example application is an augmented reality application 252 that may be used to take video or camera images and provide additional information (e.g. direction or orientation data) with the video or camera images. There may also be an application 248 for determining the facing direction or orientation, or both, of a camera. Another application shown is an address book 62 that is used to store contact information which may include, for example, a phone number, name and e-mail address.

It will be appreciated that any module or component exemplified herein that executes instructions or operations may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data, except transitory propagating signals per se. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the mobile device 100, or accessible or connectable thereto. Any application or module herein described may be implemented using computer readable/executable instructions or operations that may be stored or otherwise held by such computer readable media.

Figure 9:
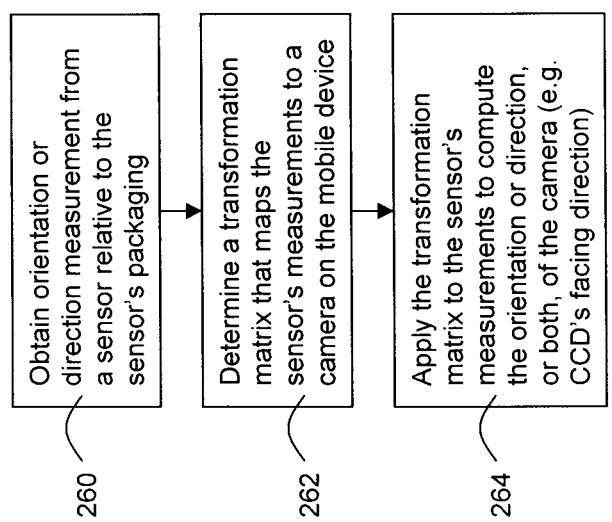
FIG. 9 is a flow diagram of example embodiment computer executable instructions for determining the orientation or direction, or both, of a camera based on a transformation matrix.

Referring to FIG. 9, example computer executable or processor implemented instructions are provided for providing orientation or direction data for a camera on a mobile device 100. At block 260, the mobile device 100 obtains the orientation or direction measurement from a sensor 210. The measurement data is relative to the sensor's orientation. The direction, for example, can be a North, South, East, West type direction which can be measured by a magnetometer. Orientation measurements can be, for example, forward, backward, left, right, up and down, clockwise, or counter clockwise. Such measurements can, for example, be measured by a gyroscope or accelerometer, or both.

The mobile device 100, at block 262, determines a transformation matrix that maps the sensor's measurement data to a camera 123 on the mobile device. The transformation matrix, for example, can be selected from a database 254, or can be selected from the database 254 and then modified, or can be computed. It can be appreciated that there are different approaches to determining the transformation matrix.

At block 264, the mobile device 100 applies the transformation matrix to the sensor's measurement data to compute the orientation or direction, or both, of the camera. In an example embodiment, the orientation which the CCD of the camera faces is computed.

Figure 10:
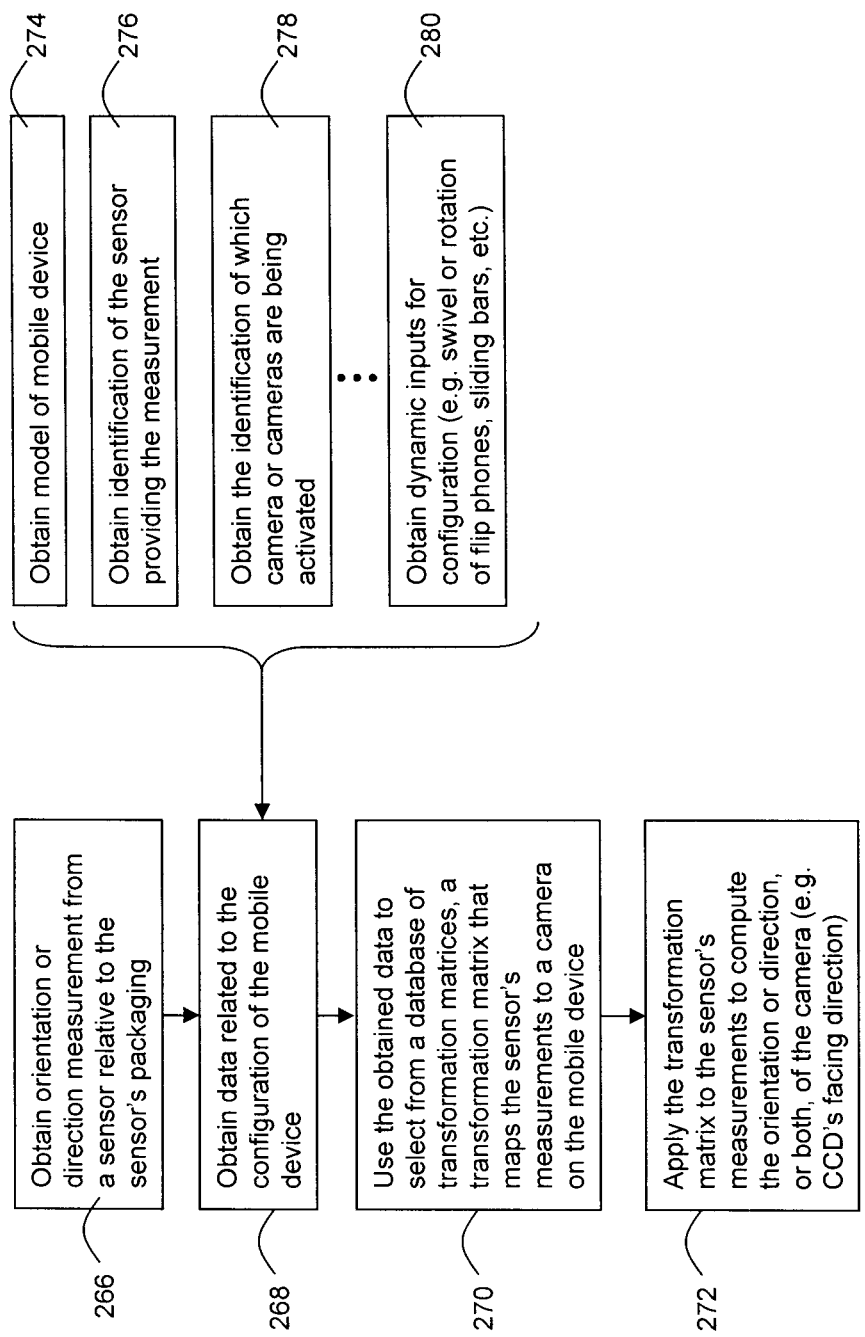
FIG. 10 is a flow diagram of example embodiment computer executable instructions for obtaining data related to the configuration of a mobile device, and using the data to select a transformation matrix that maps the sensor's measurements to a camera.

Turning to FIG. 10, example computer executable or processor implemented instructions are provided for selecting a transformation matrix. At block 266, the mobile device 100 obtains orientation or direction measurements from a sensor relative to the sensor's orientation. At block 268, the mobile device 100 obtains data related to the configuration of the mobile device 100. Non-limiting examples of obtaining such data include: obtaining the model of the mobile device (block 274); obtaining the identity or identification of the sensor providing the measurement data (block 276); obtaining the identity or identification of a given camera, or given cameras, that are being activated (block 278); and obtaining the dynamic inputs of the mobile device's configuration (e.g. swivel or rotation of a flip phone, sliding parts, etc.) (block 280).

Continuing with FIG. 10, at block 270, the mobile device 100 uses the obtained data to select from a database 254 of transformation matrices a transformation matrix that maps the sensor's measurement data to a given camera on the mobile device 100. For example, if the obtained data matches the data in the database 254, the transformation matrix associated with the matching data in the database is selected.

The obtained transformation matrix and the sensor's measurement data are used to compute the orientation or direction, or both, of the camera (block 272). For example, the sensor's measurement data may be presented in the form of a matrix, and the measurement data and the transformation matrix are multiplied (e.g. using matrix multiplication) to compute the orientation or direction data, or both, of a camera. Other methods for applying the transformation matrix are also applicable.

Figure 11:
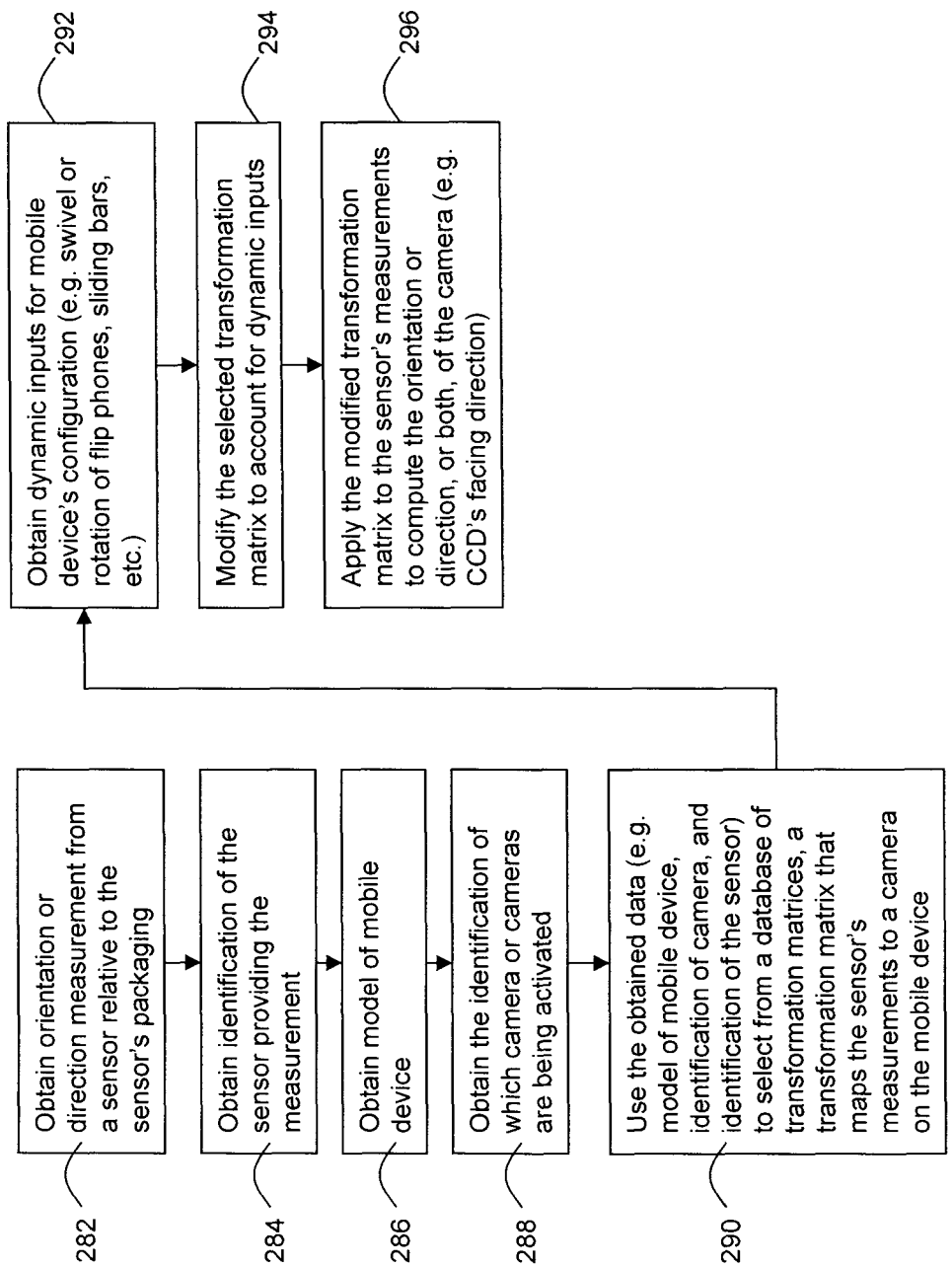
FIG. 11 is a flow diagram of example embodiment computer executable instructions for modifying a transformation matrix that maps the sensor's measurements to the camera based on dynamic inputs of the mobile device's configuration.

Turning to FIG. 11, example computer executable or processor implemented instructions are provided for computing a transformation matrix, taking into account dynamic inputs, for example from one or more auxiliary sensors 240. At block 282, the mobile device 100 obtains the orientation or direction measurement from a sensor relative to the sensor's orientation. At block 284, the mobile device 100 obtains the identification of the sensors providing the measurement. The model of the mobile device is obtained (block 286) and the identification of the camera or cameras that are being activated are obtained (block 288). The model of the mobile device 100 is used to select from the database 254 a transformation matrix that maps the given sensor's measurement data to a camera on the mobile device. The identification of the camera and the identification of the sensor may also be used to search the database 254, for example, where there are multiple cameras and multiple sensors 210 within a given model of a mobile device.

Continuing with FIG. 11, the dynamic inputs relating to the mobile device's configuration are obtained (block 292). The dynamic inputs may determine, for example, whether a flip phone is flipped open, whether a sliding portion is slid to an open position, whether a first part of a mobile device is oriented at some angle relative to a second part of the mobile device, etc. The dynamic inputs may represent angles or positions and these dynamic inputs are used to modify the selected transformation matrix (block 294). In an example embodiment, there may be one or more variables in the selected transformation matrix that are initially unknown when obtained from the database 254. After obtaining the dynamic inputs from the auxiliary sensor or sensors 240, the dynamic inputs are used to compute the values of variables in the selected transformation matrix. In another example embodiment, the value(s) of the one or more variables are the dynamic inputs.

In another example embodiment, the transformation matrix is modified by performing an operation on the transformation matrix that includes the values of the dynamic inputs. For example, the dynamic inputs can be represented in the form of a matrix. The dynamic inputs can then be added or multiplied with the transformation matrix to compute a modified transformation matrix.

At block 296, the modified transformation matrix is applied to the sensor's measurement data to compute the orientation or direction, or both, of the camera. It can be appreciated that if the dynamic input changes value, then the operations at blocks 294 and 296 are re-computed to determine a new modified transformation matrix and to determine the new orientation or direction of the camera. Similarly, if other new data is provided (e.g. sensor's measurement data, different sensor being used, different camera being used, etc.), then the camera's orientation or direction may be re-computed. The updated computation may or may not involve selecting a new transformation matrix. For example, if a different sensor or camera on the mobile device are being used, then a new transformation matrix may be selected.

Figure 12:
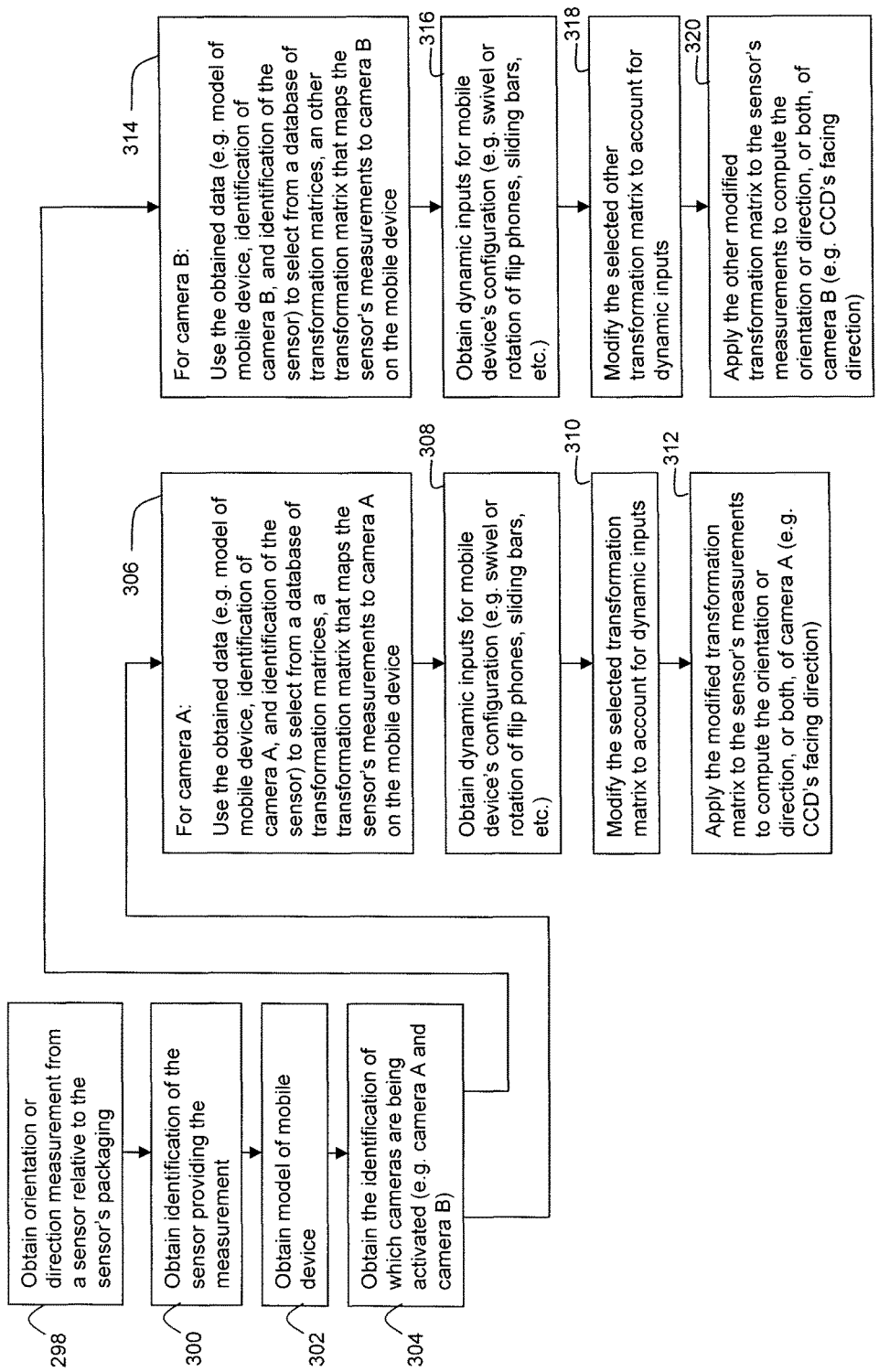
FIG. 12 is a flow diagram of example embodiment computer executable instructions for determining the orientation or direction, or both, of two cameras using transformation matrices.

Turning to FIG. 12, example computer executable or processor implemented instructions are also provided for computing the direction or orientation of two or more cameras on a mobile device 100. This may be used when a mobile device 100 has multiple cameras. For example, a mobile device may have a front facing camera (e.g. looking away from the front of the user to give the user's perspective) and a back facing camera (e.g. looking towards the user to capture images of the user or scenes behind the user). The facing directions or orientations of two or more cameras can be computed. In another example, an augmented reality application may activate two or more cameras and show on the display 12 the images or video captured by the two or more cameras. Other information, such as the direction or orientation of each camera may be also be shown on the display 12.

At block 298, the mobile device 100 obtains orientation or direction measurement data from a sensor. The measurement data is, for example, relative to the sensor's orientation. At block 300, the mobile device 100 obtains the identification of the sensor providing the measurement. At block 302, the mobile device 100 obtains the model of the mobile device (e.g. itself). At block 304, the mobile device 100 obtains the identification of which cameras are being activated. For example, it may obtain an identification for each of the two or more cameras that are being activated.

In the example provided in FIG. 12, one camera is referred to as camera A, and another camera is referred to as camera B. With respect to camera A, at block 306, the mobile device 100 uses the obtained data to select from a database 254 of transformation matrices a transformation matrix that maps the sensor's measurement data to camera A on the mobile device 100. At block 308, dynamic inputs describing the mobile device's configuration are obtained. For example, the dynamic inputs are based on the measurements from the auxiliary sensors 240. After obtaining the dynamic inputs and selecting an appropriate transformation matrix, the mobile device 100 modifies the transformation matrix to account for the dynamic inputs (block 310). At block 312, the modified transformation matrix and the sensor's measurement data are used to compute the orientation or direction, or both, of camera A.

Similar to blocks 306, 308, 310 and 312, for camera B, the mobile device 100 selects an appropriate transformation matrix from the database 254 (block 314), obtains dynamic inputs describing the mobile device's configuration (block 316), modifies the selected transformation matrix according to the dynamic inputs (block 318), and applies the modified transformation matrix to the sensor's measurement data to compute the orientation or direction, or both, of camera B (block 320). It can be appreciated that although the general process may be similar for computing the orientation or direction, or both, of the cameras, the selected transformation matrices may be different because the relative orientation and positioning between each camera and a sensor may be different. Similarly, how the dynamic inputs are used to modify the selected transformation matrix may also be different for each camera. Therefore, it can be appreciated that although the same direction or orientation measurement data from a sensor 210 is used for each camera, the computed direction or orientation of each camera may be different.

The example embodiment systems and methods described herein makes it easier for a software developer to create applications involving the use of a sensor 210 and a camera 123, for example in augmented reality applications. In particular, a developer does not need to create custom applications for each model of a mobile device to take into account the particular configuration between a sensor 210 and a camera 123. Using the example embodiments described herein, a transformation matrix is selected, and in some cases is modified, to compute the orientation or direction of a camera. The transformation matrix is appropriate for the model of the mobile device. In other words, the developer does not need to consider the numerous models of mobile devices that are available because the systems and methods described herein will account for such numerous variations.

The example embodiments described herein also allow more flexibility to develop applications for mobile devices with moving parts (e.g. flip phones, sliding bars, swivel tops, etc.). The example embodiments described herein can take into account the different configurations of a mobile device 100.

In general, a method is provided for providing an orientation of a camera on a mobile device. The method includes: obtaining an orientation measurement from a sensor relative to the orientation of the sensor; determining a transformation matrix that maps the orientation measurement to the camera; and computing the orientation of the camera using the orientation measurement and the transformation matrix.

In another example aspect, the transformation matrix includes at least one value that changes the orientation of the orientation measurement. In another example aspect, the sensor is at least one of a magnetometer, a gyroscope and an accelerometer. In another example aspect, the method further includes obtaining data related to the configuration of the mobile device. In another example aspect, the method further includes using the obtained data to select from a database of transformation matrices the transformation matrix. In another example aspect, obtaining the data includes obtaining a model identification of a mobile device.

In another example aspect, obtaining the data includes obtaining an identification of the sensor and an identification of the camera. In another example aspect, obtaining the data includes obtaining dynamic inputs describing a configuration of the mobile device, the dynamic inputs based on data provided by an auxiliary sensor on the mobile device. In another example aspect, the mobile device includes at least two parts able to move relative to each other, and the method further includes the auxiliary sensor providing the data describing the configuration of the at least two parts of the mobile device. In another example aspect, the mobile device is a flip phone. In another example aspect, the method further includes determining if the camera is being activated, and if activated, determining the transformation matrix.

In general, a mobile device is provided for providing the orientation of a camera. The mobile device includes: the camera; a sensor configured to provide an orientation measurement relative to the orientation of the sensor; and a processor configured to determine a transformation matrix that maps the orientation measurement to the camera and compute the orientation of the camera using the orientation measurement and the transformation matrix.

In general, a method is provided for providing an orientation of a camera on a mobile device. The method includes: obtaining an orientation measurement from a sensor relative to the orientation of the sensor; obtaining a model of the mobile device; obtaining an identification of the camera that is currently activated; searching a database of transformation matrices using at least the model of the mobile device and the identification of the camera as search parameters to select a transformation matrix; and applying the transformation matrix to the orientation measurement to compute the orientation of the camera.

The steps or operations in the flow charts described herein are just for example. There may be many variations to these steps or operations without departing from the spirit of the invention or inventions. For instance, the steps may be performed in a differing order, or steps may be added, deleted, or modified.

It will be appreciated that the particular example embodiments shown in the figures and described above are for illustrative purposes only and many other variations can be used according to the example embodiments described. Although the above has been described with reference to certain specific example embodiments, various modifications thereof will be apparent to those skilled in the art as outlined in the appended claims.

The invention claimed is:

1. A method implemented by a processor, of providing an orientation of a camera on a mobile device, comprising:
    obtaining an orientation measurement from a sensor relative to the orientation of the sensor;
    obtaining data related to the configuration of the mobile device;
    determining a transformation matrix that maps the orientation measurement to the camera, wherein determining the transformation matrix comprises using the obtained data to select from a database of transformation matrices the transformation matrix; and
    computing the orientation of the camera using the orientation measurement and the transformation matrix.

2. The method of claim 1 wherein the transformation matrix includes at least one value that changes the orientation of the orientation measurement.

3. The method of claim 1 wherein the sensor is at least one of a magnetometer, a gyroscope and an accelerometer.

4. The method of claim 1 wherein obtaining the data comprises obtaining a model identification of a mobile device.

5. The method of claim 1 wherein obtaining the data comprises obtaining an identification of the sensor and an identification of the camera.

6. The method of claim 1 further comprising determining if the camera is being activated, and if activated, determining the transformation matrix.

7. The method of claim 1 wherein obtaining the data comprises obtaining dynamic inputs describing a configuration of the mobile device, the dynamic inputs based on data provided by an auxiliary sensor on the mobile device.

8. The method of claim 7 wherein the mobile device comprises at least two parts able to move relative to each other, and the method further comprising the auxiliary sensor providing the data describing the configuration of the at least two parts of the mobile device.

9. The method of claim 8 wherein the mobile device is a flip phone.

10. A mobile device for providing the orientation of a camera, the mobile device comprising:
   the camera;
   a sensor configured to provide an orientation measurement relative to the orientation of the sensor; and
   a processor configured to
      obtain data related to the configuration of the mobile device;
      determine a transformation matrix that maps the orientation measurement to the camera, wherein the process is configured to determine the transformation matrix, using the obtained data to select from a database of transformation matrices the transformation matrix and
      compute the orientation of the camera using the orientation measurement and the transformation matrix.

11. The mobile device of claim 10 wherein the transformation matrix includes at least one value that changes the orientation of the orientation measurement.

12. The mobile device of claim 10 wherein the sensor is at least one of a magnetometer, a gyroscope and an accelerometer.

13. The mobile device of claim 10 wherein the processor is configured to obtain the data by obtaining a model identification of a mobile device.

14. The mobile device of claim 10 wherein the processor is configured to obtain the data by obtaining an identification of the sensor and an identification of the camera.

15. The mobile device of claim 10 wherein the processor is further configured to determine if the camera is activated, and if activated, determine the transformation matrix.

16. The mobile device of claim 10 further comprising an auxiliary sensor and wherein the processor is configured to obtain the data by obtaining dynamic inputs describing a configuration of the mobile device, the dynamic inputs based on data provided by the auxiliary sensor.

17. The mobile device of claim 16 wherein the mobile device comprises at least two parts able to move relative to each other, and the auxiliary sensor is configured to provide the data describing the configuration of the at least two parts of the mobile device.

18. The mobile device of claim 17 wherein the mobile device is a flip phone.

19. A method implemented by a processor, of providing an orientation of a camera on a mobile device, comprising:
   obtaining an orientation measurement from a sensor relative to the orientation of the sensor;
   obtaining a model of the mobile device;
   obtaining an identification of the camera that is currently activated;
   searching a database of transformation matrices using at least the model of the mobile device and the identification of the camera as search parameters to select a transformation matrix; and
   applying the transformation matrix to the orientation measurement to compute the orientation of the camera.

* * * * *